United States Patent
John et al.

(10) Patent No.: US 9,154,629 B2
(45) Date of Patent: Oct. 6, 2015

(54) SYSTEM AND METHOD FOR GENERATING PERSONALIZED TAG RECOMMENDATIONS FOR TAGGING AUDIO CONTENT

(71) Applicant: Avaya Inc., Basking Ridge, NJ (US)

(72) Inventors: Ajita John, Holmdel, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 208 days.

(21) Appl. No.: 13/715,050

(22) Filed: Dec. 14, 2012

(65) Prior Publication Data

US 2014/0172419 A1 Jun. 19, 2014

(51) Int. Cl.
  *G10L 15/00* (2013.01)
  *G10L 15/04* (2013.01)
  *G10L 15/18* (2013.01)
  *H04M 3/56* (2006.01)
  *G06F 17/30* (2006.01)
  *G10L 15/08* (2006.01)

(52) U.S. Cl.
  CPC ........... *H04M 3/56* (2013.01); *G06F 17/30746* (2013.01); *G10L 2015/088* (2013.01)

(58) Field of Classification Search
  USPC .................................................. 704/231–257
  See application file for complete search history.

(56) References Cited

U.S. PATENT DOCUMENTS

| | | | |
|---|---|---|---|
| 6,631,346 B1 * | 10/2003 | Karaorman et al. | 704/9 |
| 6,983,247 B2 * | 1/2006 | Ringger et al. | 704/251 |
| 8,553,065 B2 * | 10/2013 | Gannu et al. | 348/14.07 |
| 2004/0078190 A1 * | 4/2004 | Fass et al. | 704/7 |
| 2004/0148170 A1 * | 7/2004 | Acero et al. | 704/257 |
| 2005/0055209 A1 * | 3/2005 | Epstein et al. | 704/255 |
| 2012/0278337 A1 * | 11/2012 | Acharya | 707/748 |
| 2013/0290347 A1 * | 10/2013 | Saib | 707/748 |

* cited by examiner

*Primary Examiner* — Jesse Pullias

(57) ABSTRACT

Systems, methods, and computer-readable storage media for generating personalized tag recommendations using speech analytics. The system first analyzes an audio stream to identify topics in the audio stream. Next, the system identifies tags related to the topics to yield identified tags. Based on the identified tags, the system then generates a tag recommendation for tagging the audio stream. The system can also send the tag recommendation to a device associated with a user for presentation to the user.

20 Claims, 5 Drawing Sheets

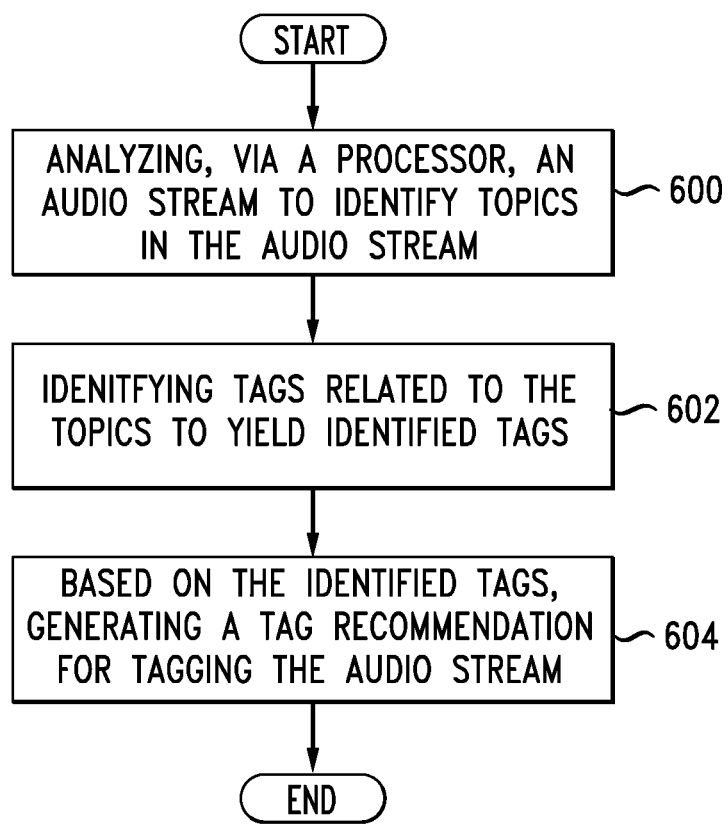

SYSTEM AND METHOD FOR GENERATING PERSONALIZED TAG RECOMMENDATIONS FOR TAGGING AUDIO CONTENT

BACKGROUND

1. Technical Field

The present disclosure relates to tagging audio content and more specifically to generating personalized tag recommendations for tagging audio content.

2. Introduction

When listening to an audio conversation or participating in the audio conversation, users often annotate the audio conversation with tags to provide additional information about the audio conversation. The tags can include information about a topic in the audio conversation, the quality of the discussion in the audio conversation, the speakers in the audio conversation, information about a segment in the audio conversation, etc. For example, the tags can identify a subject of discussion in the audio conversation. As another example, the tags can describe the discussion in the audio conversation. This information about the audio conversation provided by the tags can then help the users identify which audio conversations or segments are of interest to them, for example. The tags can also make the audio conversation searchable, so users can search information associated with the audio conversation based on the tags in the audio conversation.

Not surprisingly, the information provided by the tags in an audio conversation increases as more tags are added to the audio conversation. Unfortunately, users often limit the amount of tags they provide during an audio conversation. This is largely because creating different tags throughout an audio conversation can be an onerous task for the user. Moreover, the user can easily get interrupted or distracted when creating tags in an audio conversation. As a result, users are reluctant to create and add tags for an audio conversation. Consequently, the benefit and amount of information provided by the limited tags diminish.

To increase the amount of tags in an audio conversation, some systems try to automatically tag the audio conversation with tags generated by the system. However, these tags typically do not include any user input, and, therefore, are not personalized and are often inaccurate and imprecise. Some systems try to obtain user input by presenting tag recommendations to the user for the user to select the most accurate and useful tags. This allows the user to add tags to an audio conversation by simply accepting tag recommendations. Moreover, the user is more likely to add tags to the audio conversation when the process is simplified in this manner. As a result, the tag recommendations often yield a greater number of tags added to the audio conversation. However, such tag recommendations do not use the audio content and other useful information to determine which tags to recommend. Rather, such tag recommendations are typically based on the user's history, which does not provide a complete and accurate representation of the most relevant and useful information for recommending tags to the user.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to generate personalized tag recommendations using speech analytics. The audio of a conversation can be analyzed to identify the content of the conversation. Personalized tag recommendations can then be generated according to the content of the conversation. This way, the tag recommendations are relevant to the conversation and customized for the particular user. The tag recommendations can greatly simplify the process of tagging audio content to the user, and thus increase the likelihood that the user will tag the conversation. The additional tags can add useful information to the pool of information about the conversation. As a result, users have a great deal of information for identifying audio conversations of interest, organizing audio conversations, searching through audio conversations, etc.

Disclosed are systems, methods, and non-transitory computer-readable storage media for generating personalized tag recommendations for tagging audio content. The system first analyzes an audio stream to identify topics in the audio stream. The system can identify topics in the audio stream by comparing content of the audio stream with search terms in a knowledge base of search terms, for example. Next, the system identifies tags related to the topics to yield identified tags. Based on the identified tags, the system then generates a tag recommendation for tagging the audio stream. The tag recommendation can also be based on a tagging history of the user, a document context of the user, a communication context of the user, the role of the user in a conversation/discussion in the audio stream, etc.

A tag can be any form of annotation and/or information associated with the audio stream. For example, a tag can be a micropost, a gesture, a link, and so forth. Further, a tag can be free-form text, an object that is associated with content with various parameters (e.g., author, type, date, etc.), a pointer in the content, etc. For example, a tag can be a category associated with content, such as "defense testimony" or "requires a reference," and/or a pointer to another conversation. Moreover, a tag can provide evidence that contradicts the content which it tags. For example, a tag can be a pointer to a separate conversation with contradictory evidence. A tag can also be editorial. For example, a tag can identify the content (or a portion of the content) as funny, boring, informative, recommended, etc. In addition, a tag can identify start and/or stop points in the content, authors of the content and/or portions of the content, speakerturns, length of the content and/or portions of the content, and/or sections of the content, such as introduction, closing, etc. A tag can also provide commentary, such as "he is avoiding answering the question;" speakerturns with modifier, such as Bob is angry, etc. These examples illustrate some of the variations of a tag. However, as one of ordinary skill in the art will readily understand, a tag can include various other forms, types, formats, and/or information.

The system can send the tag recommendation to a device associated with a user to be presented to the user as a recommendation for tagging the audio stream. The system can also present the tag recommendation to the user after generating the tag recommendation. When presented with a tag recommendation, the user can accept the tag recommendation to tag the audio stream according to the tag recommendation, or otherwise reject the tag recommendation. Moreover, the user can edit the tag recommendation or suggest the tag recommendation to another user. If the user suggests the tag recommendation to another user, the system can forward the tag recommendation to another device associated with the other user.

In one embodiment, the system generates a ranked list of tag recommendations based on the identified tags. The tag recommendations in the ranked list can be determined based on a context of a previous conversation associated with a tag, a similarity between the tag and a topic identified in the audio stream, whether the user has previously accepted a recommendation of the tag in the ranked list, whether the user has previously declined the recommendation of the tag in the ranked list, and so forth. The system can send one or more tags from the ranked list of tag recommendations to the device of a user as the tag recommendation for tagging the audio stream. For example, the system can send the top tags from the ranked list of tag recommendations to the device as tag recommendations for tagging the audio stream. The system can alternatively send the entire ranked list of tag recommendations to the device to be presented to the user at the device. Moreover, the system itself can present one or more tags from the ranked list of tag recommendations, and/or the ranked list of tag recommendations, to the user for tagging the audio stream. The user can then accept or reject one or more tags presented to the user from the ranked list of tag recommendations. The user can also edit and/or forward one or more tags presented to the user from the ranked list of tag recommendations.

BRIEF DESCRIPTION OF THE DRAWINGS

FIG. 6 illustrates an example method embodiment.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure provides a way to generate personalized tag recommendations for tagging audio content. A system, method and computer-readable media are disclosed which generate personalized tag recommendations using speech analytics. A brief introductory description of a basic general purpose system or computing device in FIG. 1, which can be employed to practice the concepts, is disclosed herein. An illustrative description of a natural language spoken dialog system in FIG. 2 will then follow. A more detailed description and variations of generating personalized tag recommendations using speech analytics will then follow. These variations shall be described herein as the various embodiments are set forth. The disclosure now turns to FIG. 1.

Figure 1:
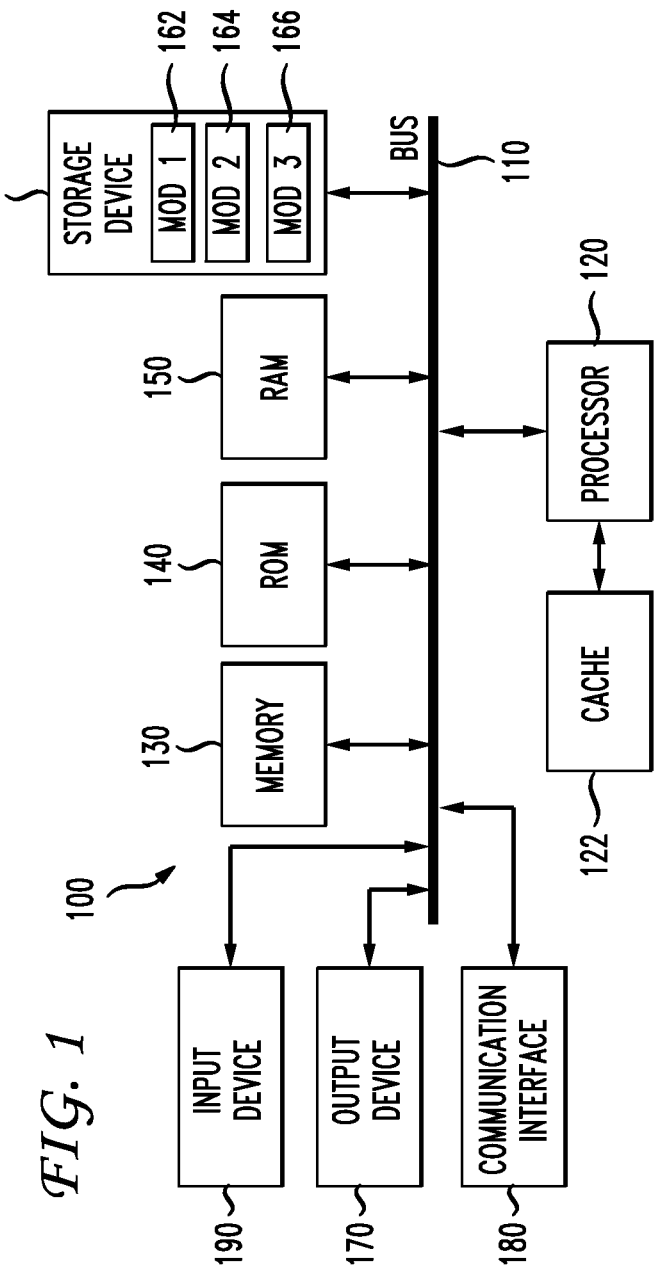
FIG. 1 illustrates an example system embodiment.

With reference to FIG. 1, an example system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache 122 of high speed memory connected directly with, in close proximity to, or integrated as part of the processor 120. The computing device 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the example embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the example operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
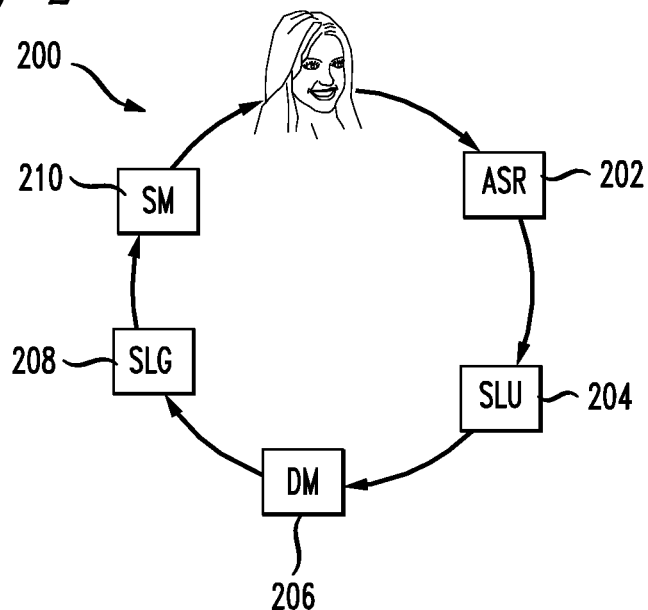
FIG. 2 illustrates a functional block diagram of an exemplary natural language spoken dialog system.

Having disclosed some components of a computing system, the disclosure now turns to FIG. 2, which illustrates a functional block diagram of an exemplary natural language spoken dialog system. Spoken dialog systems aim to identify intents of humans, expressed in natural language, and take actions accordingly to satisfy the human requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module can represent any type of artificial speech output. The present disclosure can be incorporated as part of the ASR module 202 and can be included as part of other components of the dialog system as well.

The ASR module 202 analyzes speech input and provides a textual transcription of the speech input as output. The ASR module 202 can also analyze speech and provide a tag, label, and/or index of the speech as output. Moreover, the ASR module 200 can analyze speech and identify keywords and/or terms in the speech. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, tag the speech input, identify (or understand) the meaning of the speech input and/or the transcribed speech, determine an appropriate response to the speech input, generate text of the appropriate response and, from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system.

Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." As another example, a computing device can include an ASR module that searches an audio speech file, identifies a keyword and/or phrase in the speech and generates a tag and/or index of the keyword and/or phrase. A module for performing speaker verification can join the system at any point or at multiple points in the cycle or can be integrated with any of the modules shown in FIG. 2.

Figure 3:
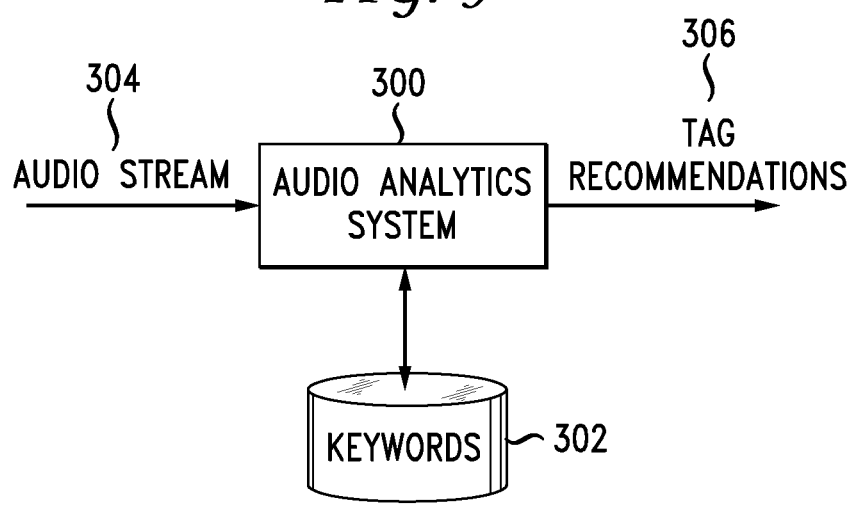
FIG. 3 illustrates an example system for generating tag recommendations using speech analytics.

The disclosure now turns to FIG. 3, which illustrates an example system for generating tag recommendations using speech analytics. The audio analytics system 300 receives an audio stream 304 as input. The audio analytics system 300 can then analyze the audio stream 304 to identify keywords, terms, and/or topics in the audio stream 304. The audio analytics system 300 obtains the keywords, terms, and/or topics, used to search the audio stream 304, from database 302.

The database 302 can store information, such as terms and keywords, for multiple topics and subjects. The information in the database 302 can be initially populated by experts, a domain vocabulary, a list of previous tags, a list of previous topics, a topic knowledge base, and/or any other source of information. Additional keywords, terms, and/or topics can then be added to the database 302 based on user communications, user input, and other sources, for example. Moreover, the database 302 can be local to the audio analytics system 300, or it can be a remote database on another device.

To identify keywords, terms, and/or topics in the audio stream 304, the audio analytics system 300 can compare the keywords, terms, and/or topics in the database 302 to the audio stream 304. The audio analytics system 300 can then identify the matching keywords, terms, and/or topics as relevant keywords, terms, and/or topics in the audio stream 304. For example, an enterprise that sells skateboards can have keywords and search phrases related to skateboards stored in the database 302. Here, when the audio analytics system 300 receives the audio stream 304, it identifies the keywords and search phrases related to skateboards in the database 302, and searches the audio stream 304 for those keywords and search phrases. In particular, the audio analytics system 300 can compare those keywords and search phrases in the database 302 with the audio stream, and identify the matching keywords and search phrases as the topics in the audio stream 304 that are related to skateboards. The audio analytics system 300 can identify the matching keywords and search phrases based on, for example, a similarity, a threshold, a score, a probability, etc.

Further, the audio analytics system 300 can map or associate keywords and/or search phrases to specific segments in the audio stream 304. For example, if the audio analytics system 300 detects the word "bearings" in the audio stream 304, it can associate the word "bearings" with the specific segment of the audio stream 304 that contains the word. This way, the audio analytics system 300 can capture both the topics in the audio stream 304, and the flow, distribution, and/or location of topics in the audio stream 304. The audio analytics system 300 can also identify speakers in specific segments of the audio stream 304. Thus, the audio analytics system 300 can detect speakerturns in the audio stream 304 to detect the speaker in a particular segment of the audio stream 304.

Using the keywords, terms, and/or topics in the audio stream 304, the audio analytics system 300 can then generate tag recommendations 306. For example, if the audio analytics system 300 identifies the word "bearings" in the audio stream 304, it can generate a tag recommendation including the words "skateboard parts," "skateboard wheels," "skateboard bearings," and/or "bearings." To generate tag recommendations, the audio analytics system 300 can also use a user's communication context and/or tagging history. For example, the audio analytics system 300 can identify which tags the user has accepted or rejected in the past, which tags the user has used in the past, which tags the user has created or edited in the past, which tags the user has shared or suggested for other users, how the user has rated previous tags, which documents the user has worked on and/or is presently working on, what communications the user has sent and/or received, etc. The audio analytics system 300 can then use this information to score various tags and/or determine which tags to recommend to the user. The audio analytics system 300 can also use this information to rank various tags to generate a list of ranked tags. The audio analytics system 300 can then provide the list of ranked tags, or one or more tags from the list, as the tag recommendation to the user.

Figure 4:
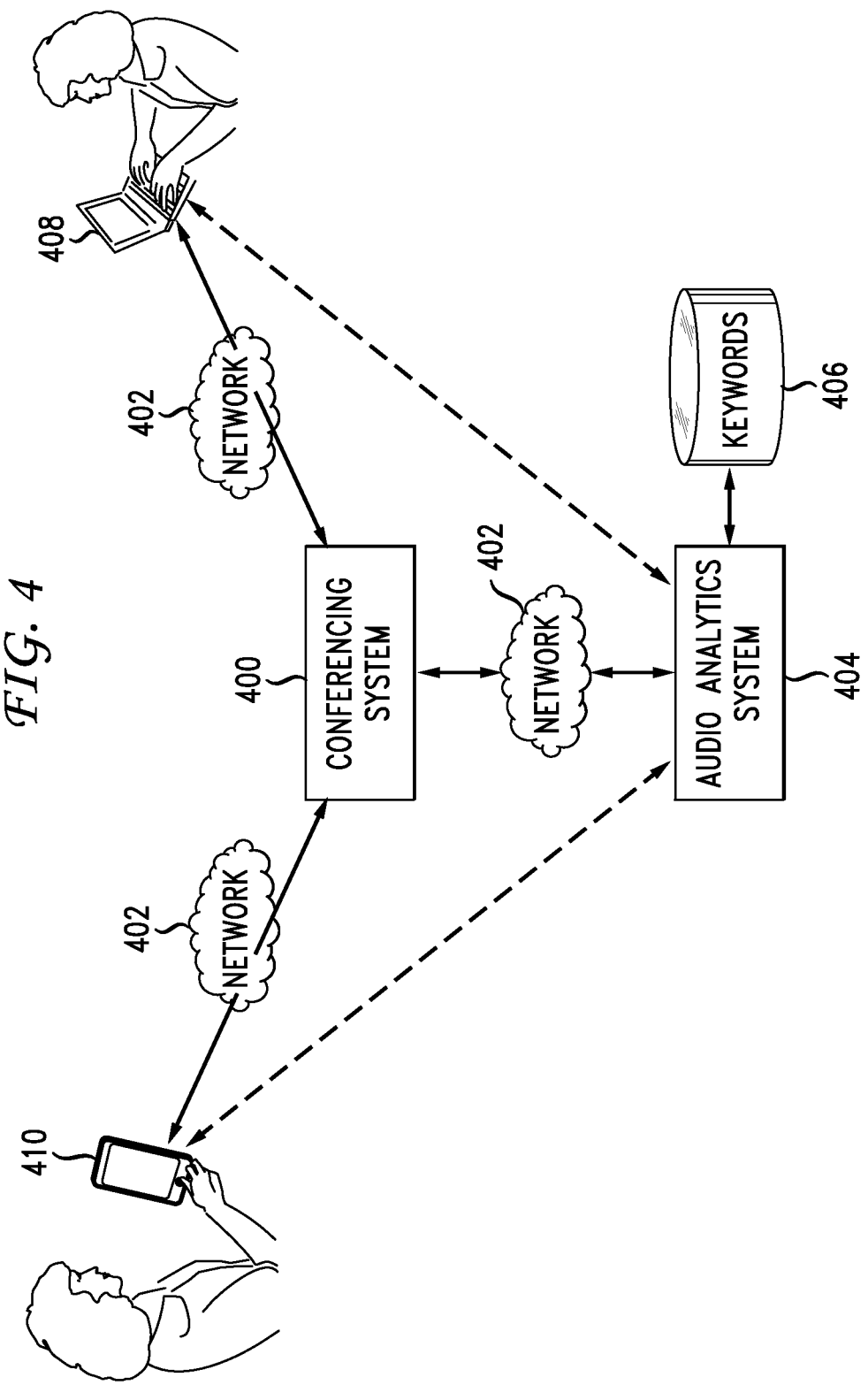
FIG. 4 illustrates an example system for generating tag recommendations in an audio conference.

FIG. 4 illustrates an example system for generating tag recommendations in an audio conference. Here, the user devices 408, 410 communicate with the conferencing system 400 to establish an audio conference. Moreover, the audio analytics system 404 communicates with the conferencing system 400 to obtain the audio in the audio conference. The audio analytics system 404 and the user devices 408, 410 communicate with the conferencing system 400 via a network 402. The user devices 408, 410 can be any devices with audio and networking capabilities, such as computers, smartphones, video game consoles, conferencing systems, network media players, portable media players, etc. The network 402 can include a public network, such as the Internet, but can also include a private or quasi-private network, such as an intranet, a home network, a virtual private network (VPN), a shared collaboration network between separate entities, etc. Indeed, the principles set forth herein can be applied to many types of networks, such as local area networks (LANs), virtual LANs (VLANs), corporate networks, wide area networks, and virtually any other form of network.

As the audio analytics system 404 obtains audio in the audio conference from the conferencing system 400, it can analyze the audio to identify content in the audio. The audio analytics system 404 can retrieve keywords, terms, and/or topics stored in the database 406, to search the audio in the audio conference. Here, the audio analytics system 404 compares the keywords, terms, and/or topics from the database 406 with the audio and identifies matching keywords, terms, and/or topics. The audio analytics system 404 can match the keywords, terms, and/or topics based on a similarity, a confidence score, a threshold, a probability, etc. The matching keywords, terms, and/or topics can be identified by the audio analytics system 404 as topics in the audio from the audio conference.

The audio analytics system 404 can then use the identified topics in the audio to generate tag recommendations. For example, the audio analytics system 404 can generate a tag recommendation based on a particular topic identified in the audio. The audio analytics system 404 can also use other information when generating tag recommendations. For example, the audio analytics system 404 can analyze a user's tagging history to determine which tags are relevant and/or acceptable to the user. The audio analytics system 404 can also use other information such as a user's current and/or prior communication context, tag ratings, content in a document used by the user, etc. The tag recommendations can include one or more tags. For example, the tag recommendations can include the top tags associated with a topic in the audio conference. Moreover, the tag recommendations can include a list of ranked tags. The tags in the list of ranked tags can be ranked based on the various information used to generate the tag recommendations. The tags can be ranked based on a history, a likelihood of acceptance, a similarity, a priority, a confidence score, a relevance, ratings, etc.

The audio analytics system 404 can send the tag recommendations to the user devices 408, 410, for presentation at the user devices 408, 410. The audio analytics system 404 can send the tag recommendations directly to the user devices 408, 410, or it can send the tag recommendations via the conferencing system 400. The user devices 408, 410 can then present the tag recommendations for users to tag the audio conference. The users can accept or reject the tag recommendations presented on the user devices 408, 410. The users can also edit and/or rate the tag recommendations, and tag the audio conference based on the edited/rated tag recommendations. Further, the users can suggest the tag recommendations to other users for tagging the audio conference.

While FIG. 4 is illustrated with reference to an audio conference, one of skill in the art will recognize that the principles disclosed herein can be applied in other contexts, such as a pre-recorded media conference, a video conference, and any media conference having an audio portion, for example. Moreover, one of skill in the art will recognize that the audio conference in FIG. 4 can be a live audio conference or a pre-recorded audio conference.

Figure 5:
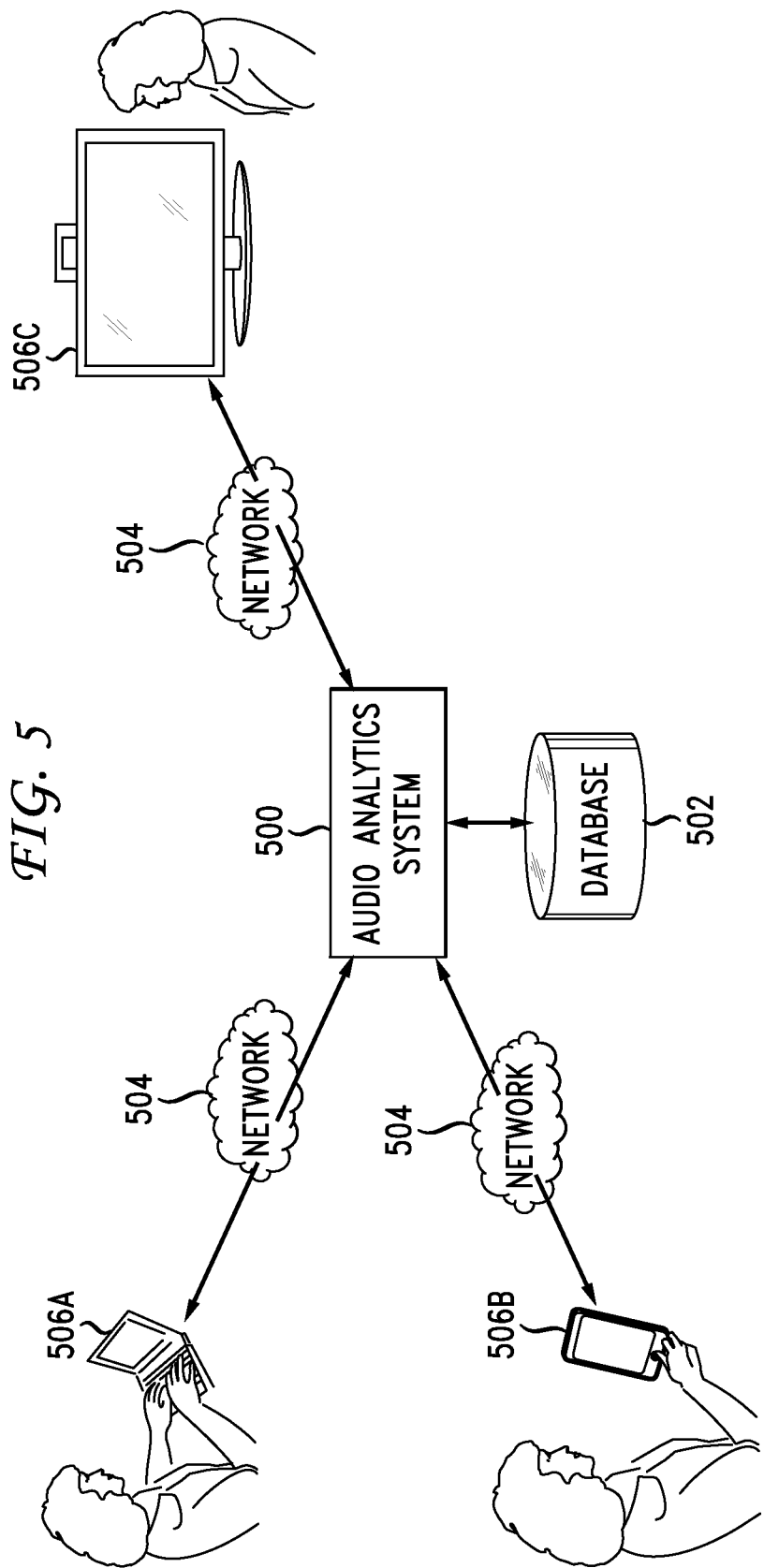
FIG. 5 illustrates an example architecture for generating tag recommendations using speech analytics.

FIG. 5 illustrates an example architecture for generating tag recommendations using speech analytics. The audio analytics system 500 analyzes audio in an audio stream to identify content, such as topics, phrases, terms, keywords, etc., in the audio stream. The audio analytics system 500 can then use the content identified in the audio stream to generate personalized tag recommendations for users based on the content in the audio stream.

The audio analytics system 500 can obtain the audio in a pre-recorded audio stream from a file stored in a storage on the audio analytics system 500 or a remote device. The audio analytics system 500 can also obtain the audio in the audio stream from the user devices 506A-C. The user devices 506A-C can include any device with audio and networking capabilities. Moreover, the user devices 506A-C and the audio analytics system 500 can communicate over network 504. The network 504 can include a public network, such as the Internet, but can also include a private or quasi-private network, such as an intranet, a home network, a virtual private network (VPN), a shared collaboration network between separate entities, etc.

The audio analytics system 500 can identify content in the audio stream by searching for keywords, phrases, and/or terms in the audio stream. The audio analytics system 500 can identify content in the audio stream based on a match between the audio and a keyword/term used to search the audio stream. A match can be calculated based on a similarity, a score, a probability, a threshold, a relevance, etc. The audio analytics system 500 can obtain the keywords, phrases, and/or terms used to search the audio stream from the database 502, which can be a database of keywords and/or terms stored on the audio analytics system 500 or at any remote device, such as a remote server. Based on the content identified in the audio stream, the audio analytics system 500 can generate tag recommendations for the user devices 506A-C. For example, the audio analytics system 500 can identify that "telescopes" is a topic discussed in the audio stream and, based on the topic "telescopes," can generate tag recommendations related to "telescopes," such as "dobsonian," "refracting," "reflecting," "eye pieces," etc. This way, the tag recommendations are relevant to the content of the audio stream and, therefore, can be more helpful to the user.

As another example, if the audio analytics system 500 detects a topic such as "telescopes" in the audio stream, it can generate tag recommendations based on facets (such as "reflecting," "refracting," etc.) related to that topic ("telescopes") that are stored in a database. This database can be populated by a domain expert for each topic in the database. The audio analytics system 500 can also use phrases, such as "description of a lens of a telescope," "configuration of a dobsonian telescope," etc. The phrases can similarly be populated in a database by domain experts. Further, the audio analytics system 500 can also generate the tag recommendations based on other tags that have been contributed by the user and/or other users in the past and which contain the topic word "telescope" and/or a closely related topic word or phrase. Here, a similarity of the topic word or phrase and the topic in the audio stream can be computed based on similarity measures, for example. Moreover, in generating tag recommendations, the audio analytics system 500 can extract phrases containing the topic word "telescope" and/or a similar word/phrase from the audio stream itself.

The audio analytics system 500 can also use other information in generating the tag recommendations to provide increased personalization. For example, the audio analytics system 500 can analyze a user's tagging history to determine which tag recommendations may be better for that particular user. The audio analytics system 500 can take into account what tags the user has previously used, accepted, rejected, edited, shared, and/or suggested, for example. The audio analytics system 500 can also take into account other factors, such as ratings associated with the tags, relevance of the tags, age of the tags, popularity of the tags, etc. The audio analytics system 500 can assign scores and/or weights to the various factors analyzed to determine which tags to recommend. For example, if a user has previously accepted a tag, that tag can be given greater weight than another tag that the user has previously rejected. The audio analytics system 500 can rank a number of tags to create a list of ranked tags. The audio analytics system 500 can rank the tags based on the scores and/or weights assigned to the tags and/or the various factors analyzed for the tags. For example, the audio analytics system 500 can rank the top 10 tags to create a top 10 list of ranked tags.

Moreover, the audio analytics system 500 can also use the user's context to generate the tag recommendations. For example, the audio analytics system 500 can determine which tags to recommend based in part on what documents the user is working on, what emails the user is reading or editing, what users the user is communicating with, the current date and time, the content of the documents and communications associated with the user, etc. The audio analytics system 500 can also use information associated with the tags to determine which tags to recommend. For example, the audio analytics system 500 can give a higher priority or weight to tags created by a particular user, such as an expert or a manager, and/or tags having higher ratings. The various factors can be weighed to generate more accurate, helpful, and personalized tag recommendations for the user.

Once the audio analytics system 500 has generated the tag recommendations, it can send the tag recommendations to the user devices 506A-C for presentation to the users at those devices. The audio analytics system 500 can broadcast the same tag recommendations to the group, or it can send one or more personalized tag recommendations to each user device 506A-C. The audio analytics system 500 does not have to send the same amount of tag recommendations to each user device 506A-C. For example, the audio analytics system 500 can send more tag recommendations to user device 506A than user device 506B if the audio analytics system 500 determines that there are more tag recommendations relevant to the user at the user device 506A.

The user devices 506A-C receive the tag recommendations and present them to the users at each respective device. The user devices 506A-C can present the tag recommendations as a list, such as a ranked list, an image, text, audio, video, and/or a combination thereof. The audio analytics system 500 can generate the tag recommendations in real time and send the tag recommendations to the user devices 506A-C to be presented to the users in real time. For example, the audio analytics system 500 can generate tag recommendations as the users at the user devices 506A-C are listening to the audio in the audio stream, and the user devices 506A-C can then present the tag recommendations to the users as they listen to the audio in the audio stream.

The tag recommendations presented at the user devices 506A-C can be accepted or rejected by the users. If a user accepts a tag recommendation, the respective user device and/or the audio analytics system 500 uses that tag recommendation to tag the audio stream. If a user rejects a tag recommendation, the tag recommendation can then be closed or removed from the display. The audio analytics system 500 can keep a record of each user's response for future use in generating other tag recommendations. The tag recommendations presented at the user devices 506A-C can also be edited, rated, commented on, and/or forwarded by users. For example, a user can accept a tag recommendation and make a change to the tag before tagging the audio stream. As another example, the user can suggest a tag recommendation to another user, who can then accept, reject, edit, suggest, and/or rate the tag recommendation.

Having disclosed some basic system components and concepts, the disclosure now turns to the example method embodiment shown in FIG. 6. For the sake of clarity, the method is described in terms of example system 100, as shown in FIG. 1, configured to practice the method. The steps outlined herein are illustrative and can be implemented in any combination thereof, including combinations that exclude, add, or modify certain steps.

FIG. 6 illustrates an example method embodiment. The system 100 first analyzes an audio stream to identify topics in the audio stream (600). The system 100 can identify topics in the audio stream by comparing content in the audio stream with search terms and/or keywords in a knowledge base or database of search terms, for example. The system 100 can search the audio stream for terms and/or keywords from the knowledge base/database. The system 100 can then identify the matching terms and/or keywords as the topics in the audio stream. The system 100 can identify a match based on a similarity, a probability, a score, a weight, a relevance, etc.

Next, the system 100 identifies tags related to the topics to yield identified tags (602). The system 100 can use the topics in the audio stream to search for tags that are relevant to the topics. The system 100 can identify the tags from a database of tags, for example. The system 100 can also identify tags from prior tags used by users. The system 100 can also search content from various sources, such as the Internet and/or a domain vocabulary, to identify tags related to the topics.

Based on the identified tags, the system 100 then generates a tag recommendation for tagging the audio stream (604). The system 100 can select some or all of the identified tags to generate the tag recommendation. Moreover, the system 100 can generate the tag recommendation by selecting one or more of the identified tags based on various factors, such as tag ratings, tag priorities, tag scores, tag weights, user context, communication context, tagging history of the user, etc. The system 100 can score and/or weigh the identified tags and select one or more tags based on the score and/or weight. For example, the system 100 can score each of the identified tags based on whether the user has previously accepted, rejected, used, edited, rated, or suggested a tag; the age of the tag; the rating of the tag; the identity of a user that created, suggested, edited, accepted, or rejected the tag; etc. The system 100 can then select one or more tags based on the scores. The system 100 can also rank the identified tags to generate a list of ranked tags. The system 100 can rank the identified tags based on a score, a weight, a relevance, a rating, a priority, etc.

The system 100 can send the tag recommendation to a device associated with a user to be presented to the user as a recommendation for tagging the audio stream. The system 100 can also present the tag recommendation to a user after generating the tag recommendation. When presented with a tag recommendation, the user can accept the tag recommendation to tag the audio stream according to the tag recommendation, or otherwise reject the tag recommendation. Moreover, the user can edit and/or rate the tag recommendation, suggest the tag recommendation to another user, etc. If the user suggests the tag recommendation to another user, the system 100 can forward the tag recommendation to another device associated with the other user. Also, the tag recommendation can be presented to the user as a list, an image, text, audio, and a combination thereof.

In one embodiment, the system 100 generates a ranked list of tag recommendations based on the identified tags. The tag recommendations in the ranked list can be determined based on a context of a previous conversation associated with a tag, a similarity between the tag and a topic identified in the audio stream, whether the user has previously accepted a recommendation of the tag in the ranked list, whether the user has previously declined the recommendation of the tag in the ranked list, and so forth. The system 100 can send one or more tags from the ranked list of tag recommendations to the device of a user as the tag recommendation for tagging the audio stream. For example, the system 100 can send the top tags from the ranked list of tag recommendations to the device as tag recommendations for tagging the audio stream. The system 100 can alternatively send the entire ranked list of tag recommendations to the device to be presented to the user at the device. Moreover, the system 100 itself can present one or more tags from the ranked list of tag recommendations, and/or the ranked list of tag recommendations, to the user for tagging the audio stream. The user can then accept or reject one or more tags presented to the user from the ranked list of tag recommendations. The user can also edit and/or forward one or more tags presented to the user from the ranked list of tag recommendations.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   analyzing, via a processor, an audio stream of an utterance of a user to identify topics in the audio stream;
   identifying tags related to the topics;
   identifying content of a document that the user is working on; and
   based on the tags, the topics, and the content of the document, generating a tag recommendation for tagging the audio stream.

2. The method of claim 1, further comprising sending the tag recommendation to a device associated with a user to be presented to the user as a recommendation for tagging the audio stream.

3. The method of claim 1, wherein the tag recommendation is further based on one of a tagging history of a user and a context of the user.

4. The method of claim 1, further comprising generating a ranked list of tag recommendations based on the identified tags.

5. The method of claim 4, wherein the tag recommendations in the ranked list are ranked based on one of a context of a conversation when a tag was previously used by a user, a similarity between the tag and a topic identified in the audio stream, whether the user has previously accepted a recommendation of the tag in the ranked list, and whether the user has previously declined the recommendation of the tag in the ranked list.

6. The method of claim 4, further comprising sending a tag from the ranked list of tag recommendations to a device as the tag recommendation for tagging the audio stream.

7. The method of claim 1, wherein the tag recommendation is configured to allow a user to edit the tag recommendation.

8. The method of claim 1, wherein analyzing the audio stream to identify topics in the audio stream comprises comparing content of the audio stream with search terms in a knowledge base of search terms.

9. A system comprising:
   a processor; and
   a computer-readable storage device storing instructions which, when executed by the processor, cause the processor to perform operations comprising:
      analyzing an audio stream of an utterance of a user to identify topics in the audio stream;
      identifying tags related to the topics to yield identified tags;
      identifying content of a document associated with the user; and
      based on the tags, the topics, and the content of the document, generating a tag recommendation for tagging the audio stream.

10. The system of claim 9, wherein the computer-readable storage device stores additional instructions which, when executed by the processor, cause the processor to perform further operations comprising sending the tag recommendation to a device associated with a user to be presented to the user as a recommendation for tagging the audio stream.

11. The system of claim 9, wherein the tag recommendation is further based on one of a tagging history of a user and a context of the user.

12. The system of claim 9, wherein the computer-readable storage device stores additional instructions which, when executed by the processor, cause the processor to perform further operations comprising generating a ranked list of tag recommendations based on the identified tags.

13. The system of claim 12, wherein the tag recommendations in the ranked list are ranked based on one of a context of a conversation when a tag was previously used by a user, a similarity between the tag and a topic identified in the audio stream, whether the user has previously accepted a recommendation of the tag in the ranked list, and whether the user has previously declined the recommendation of the tag in the ranked list.

14. The system of claim 12, wherein the computer-readable storage device stores additional instructions which, when executed by the processor, cause the processor to perform further operations comprising sending a tag from the ranked list of tag recommendations to a device as the tag recommendation for tagging the audio stream.

15. The system of claim 9, wherein the tag recommendation is configured to allow a user to edit the tag recommendation.

16. A computer-readable storage device storing instructions which, when executed by a processor, cause the processor to perform operations comprising:
   analyzing an audio stream of an utterance of a user to identify topics in the audio stream;
   identifying tags related to the topics;
   identifying content of a document that the user is working on; and
   based on the tags, the topics, and the content of the document, generating a tag recommendation for tagging the audio stream.

17. The computer-readable storage device of claim 16, wherein analyzing the audio stream to identify topics in the audio stream comprises comparing content of the audio stream with search terms in a knowledge base of search terms.

18. The computer-readable storage device of claim 16, storing additional instructions which, when executed by the processor, cause the processor to perform further operations comprising sending the tag recommendation to a device associated with a user to be presented to the user as a recommendation for tagging the audio stream.

19. The computer-readable storage device of claim 16, wherein the tag recommendation is further based on one of a tagging history of a user and a context of the user.

20. The computer-readable storage device of claim 16, storing additional instructions which, when executed by the processor, cause the processor to perform further operations comprising generating a ranked list of tag recommendations based on the identified tags.

* * * * *